(12) United States Patent
Tran

(10) Patent No.: US 12,435,914 B2
(45) Date of Patent: Oct. 7, 2025

(54) WATER HEAT DISSIPATING SYSTEM USED FOR CONDENSER COIL OF WATER FILTER APPARATUS AND WATER FILTER APPARATUS

(71) Applicant: Son Van Tran, Ha Noi (VN)

(72) Inventor: Son Van Tran, Ha Noi (VN)

(73) Assignee: KAROFI HOLDING JOINT STOCK COMPANY, Ha Noi (VN)

( * ) Notice: Subject to any disclaimer, the term of this patent is extended or adjusted under 35 U.S.C. 154(b) by 456 days.

(21) Appl. No.: 17/961,744

(22) Filed: Oct. 7, 2022

(65) Prior Publication Data

US 2023/0051445 A1 Feb. 16, 2023

(30) Foreign Application Priority Data

Oct. 20, 2021 (VN) .............. 1-2021-06614

(51) Int. Cl.
*B01D 61/02* (2006.01)
*B01D 61/08* (2006.01)
(Continued)

(52) U.S. Cl.
CPC ............ *F25B 39/00* (2013.01); *B01D 61/025* (2013.01); *B01D 61/08* (2013.01); *B01D 61/10* (2013.01);
(Continued)

(58) Field of Classification Search
CPC .... F25B 39/00; F25B 39/04; F25B 2339/046; F25B 2339/047; B01D 61/025;
(Continued)

(56) References Cited

FOREIGN PATENT DOCUMENTS

| CN | 103799860 A | * | 5/2014 |
| CN | 110776120 A | * | 2/2020 |

(Continued)

OTHER PUBLICATIONS

English language machine translation of CN103799860, 8 pages, No Date.*

(Continued)

*Primary Examiner* — Pranav N Patel

(57) ABSTRACT

The present invention relates to a water heat dissipating system used for a condenser coil of a water filter apparatus, the system comprising: said condenser coil of the water filter apparatus including a bent refrigerant pipeline part with a suitable shape for transferring heat from refrigerant conducted by the condenser coil to outside; a water heat dissipating container for containing water therein, the water heat dissipating container having a water heat dissipating container inlet and a water heat dissipating container outlet to circulate water contained in the water heat dissipating container. The bent refrigerant pipeline part is arranged inside the water heat dissipating container for transferring heat from refrigerant conducted inside the bent refrigerant pipeline part to water contained in the water heat dissipating container. The water heat dissipating container inlet is connected to at least a waste water outlet of a RO filter cartridge (Reverse Osmosis) of the water filter apparatus. The present invention also relates to a water filter apparatus using the water heat dissipating system.

7 Claims, 3 Drawing Sheets

(51) Int. Cl.
*B01D 61/10* (2006.01)
*C02F 1/44* (2023.01)
*F25B 39/00* (2006.01)
*F25B 39/04* (2006.01)

(52) U.S. Cl.
CPC .......... *C02F 1/441* (2013.01); *B01D 2311/06* (2013.01); *B01D 2313/22* (2013.01); *B01D 2313/44* (2013.01); *C02F 2201/006* (2013.01); *F25B 39/04* (2013.01); *F25B 2339/046* (2013.01); *F25B 2339/047* (2013.01)

(58) Field of Classification Search
CPC .... B01D 61/08; B01D 61/10; B01D 2311/06; B01D 2313/22; B01D 2313/44; C02F 1/441; C02F 2201/006; C02F 2303/10; F28D 7/04

See application file for complete search history.

(56) References Cited

FOREIGN PATENT DOCUMENTS

| | | | | |
|---|---|---|---|---|
| CN | 113277662 A | * | 8/2021 | ................ C02F 9/00 |
| JP | H0615272 A | * | 1/1994 | |

OTHER PUBLICATIONS

English language machine translation of CN113277662, 7 pages, No Date.*

English language machine translation of JPH0615272A, 5 pages, No Date.*

English language machine translation of CN-110776120-A, 13 pages, No Date.*

* cited by examiner

WATER HEAT DISSIPATING SYSTEM USED FOR CONDENSER COIL OF WATER FILTER APPARATUS AND WATER FILTER APPARATUS

TECHNICAL FIELD

The present invention relates to a water heat dissipating system used for condenser coil of the water filter apparatus and the water filter apparatus using the same.

BACKGROUND

Currently, the demands for water filter apparatuses are becoming more and more popular and focused. Therefore, manufacturers are always aiming for water filter apparatuses which are diversely designed to meet the variety demands of the user at the highest level. One among designs of the water filter apparatuses which may meet multi demands of the user simultaneously is a water filter apparatus which may simultaneously for condenser coil of water cooling system is an important factor, however this has not given sufficient researches for enhancing the efficiency and the durability of use.

As for the water filter apparatuses using a natural heat dissipating condenser coil, generally have the heat dissipating efficiency not high.

To overcome the mentioned issue, several water filter apparatuses on the market using an aluminum dissipator with a cooling fan for dissipating for the condenser coil. Although the heat dissipating efficiency is increased, however this approach not only make a highly noise during operation, but also have a large size and have a relatively high cost.

Hence, there is a need to provide a novel improvement for the water cooling system of the water filter apparatus, in particularly an approach for the heat dissipation of the condenser coil of the water filter apparatus, for improving the heat dissipating efficiency, minimize the size, and reduce the cost.

SUMMARY

An object of the present invention is to provide a water heat dissipating system used for condenser coil of the water filter apparatus, may overcome one or more of the above-mentioned problems.

Another object of the present invention is to provide a water heat dissipating system used for condenser coil of the water filter apparatus, may enhance the heat dissipating efficiency, minimize the size, and reduce the cost.

Yet another object of the present invention is to provide a water heat dissipating system used for condenser coil of the water filter apparatus, may utilize the wasted water during filtering process of a RO filter cartridge for used in the heat dissipation for the condenser coil of the water filter apparatus.

Still, another object of the present invention is to provide a water filter apparatus using the above water heat dissipating system.

Various objects to be achieved by the present invention are not limited to the aforementioned objects, and those skilled in the art to which the disclosure pertains may clearly understand other objects from the following descriptions.

To achieve one or more above objects, the present invention provides a water heat dissipating system used for a condenser coil of a water filter apparatus, the system comprising:

said condenser coil of the water filter apparatus including a bent refrigerant pipeline part with a suitable shape for transferring heat from refrigerant conducted by the condenser coil to outside;

a water heat dissipating container for containing water therein, the water heat dissipating container having a water heat dissipating container inlet and a water heat dissipating container outlet to circulate water contained in the water heat dissipating container when there is water supplied to the water heat dissipating container inlet;

wherein:

the bent refrigerant pipeline part is arranged inside the water heat dissipating container for transferring heat from refrigerant conducted inside the bent refrigerant pipeline part to water contained in the water heat dissipating container, the water heat dissipating container inlet is connected to at least a waste water outlet of a RO filter cartridge (Reverse Osmosis) of the water filter apparatus.

According to an embodiment, said system further including an additional pipeline communicated from pressure tank of the water filter apparatus to the water heat dissipating container inlet, for supplying water to the water heat dissipating container inlet, at least when the RO filter cartridge has not yet operated or been operated with a limitation capacity.

Preferably, said system further including a water regulating valve equipped on the additional pipeline.

According to an embodiment, said system further including a water return line connected at a position where is in between an outlet of a booster pump and an inlet of the RO filter cartridge return back at the position of the inlet of the booster pump, for reducing water flow supplied to the RO filter cartridge, and therefore reducing the corresponding waste water of the RO filter cartridge.

Preferably, said system further including a water regulating valve equipped on the water return line.

Preferably, said system further including a flow valve equipped at the position which is between the water heat dissipating container inlet and the waste water outlet of the RO filter cartridge the water filter apparatus.

According to an embodiment, the water heat dissipating container is made from plastic, having a rectangular parallelepiped shape with an opening surface with a watertight cover, to facilitate for installing the bent refrigerant pipeline part of the condenser coil.

The water heat dissipating container inlet and outlet of the water heat dissipating container having fast connectors arranged on the outer surface of the water heat dissipating container, and The bent refrigerant pipeline part of the condenser coil having connectors, for connecting to the cooling coil of the water filter apparatus, arranged on the outer surface of the water heat dissipating container.

According to another aspect, the present invention provides a water filter apparatus comprising:

a water cooling container;

a cooling system including a cooling coil and a condenser coil for cyclically circulating refrigerant, such that the refrigerant cooling down water contained in the water cooling container at the cooling coil region and dissipates heat at the condenser coil region;

at least a water filter unit with a RO filter cartridge for supplying filtered water into the water cooling container, wherein the RO filter cartridge having a waste water outlet;

a water heat dissipating system mentioned above used for dissipating for the condenser coil of the water filter apparatus.

Preferably, the water filter apparatus using a cabinet cover for containing at least main components of the water filter apparatus inside the cabinet cover.

DESCRIPTION OF EMBODIMENTS

Hereinafter, advantages, efficiencies, and inventive concepts of the present invention shall be understood more clearly through the detailed description of the preferred embodiments with reference to the accompanying drawings. However, it is understood that those preferred embodiments are mainly intended for illustrating and descriptive purposes for a person skilled in the art to which the present disclosure pertains, to fully understand the inventive concepts and the advantages of the present invention without any limitation the scope of the present invention to the following described embodiments.

Figure 1:
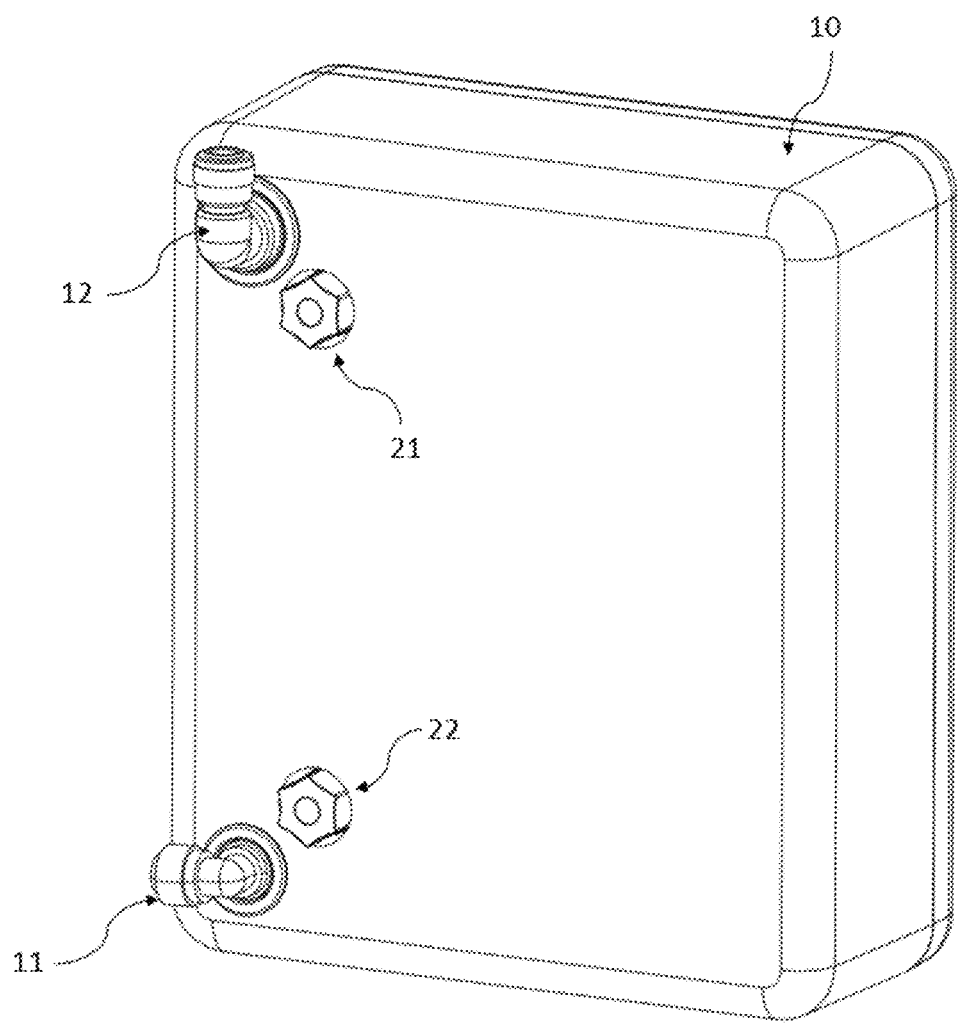
FIG. 1 is a perspective view from outside illustrating a water heat dissipating system used for a condenser coil of a water filter apparatus according to an embodiment of the present invention.
Figure 2:
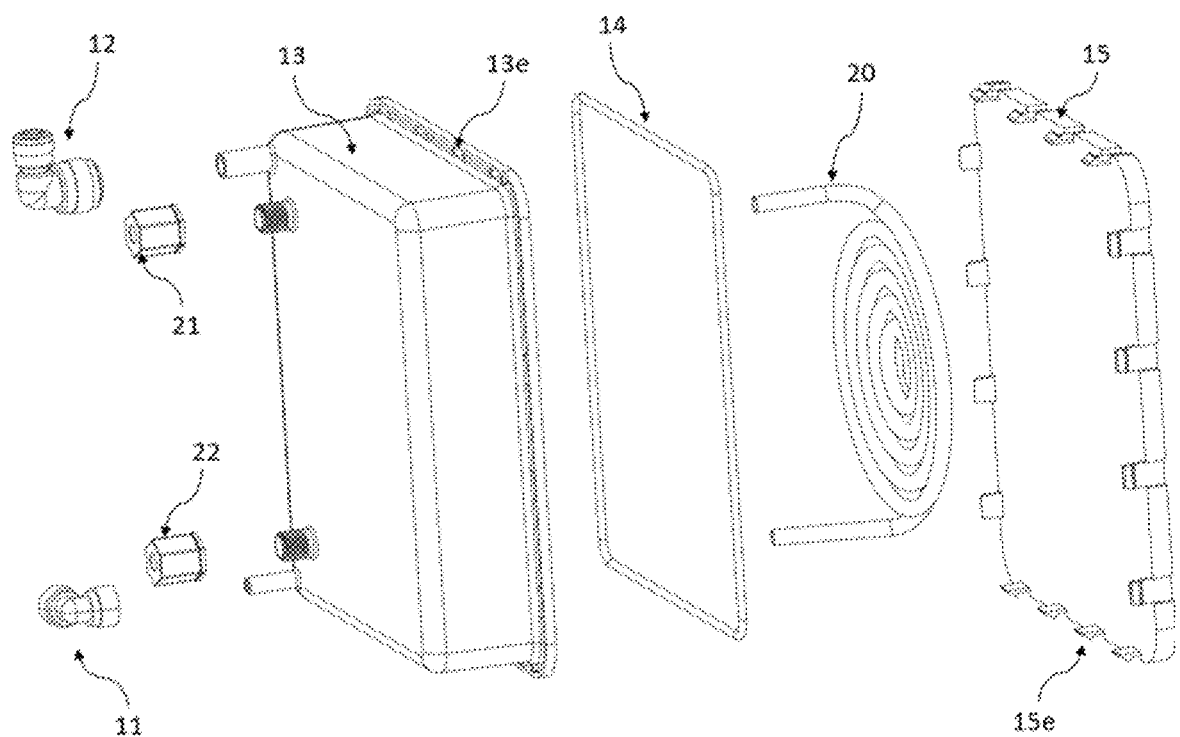
FIG. 2 is an exploded perspective view illustrating a water heat dissipating system used for a condenser coil of a water filter apparatus according to an embodiment of the present invention.

FIG. 1 and FIG. 2 show a water heat dissipating system used for condenser coil of the water filter apparatus according to an embodiment of the present invention. The water filter apparatus according to the present invention is a water filter apparatus RO with water cooling system to be filtered to provide a cooling filtered water for users.

As shown in FIG. 1 and FIG. 2, the water heat dissipating system according to the embodiment including a water heat dissipating container 10 and a condenser coil of the water filter apparatus including a bent refrigerant pipeline part 20.

The water heat dissipating container 10 for containing water therein, the water heat dissipating container having a water heat dissipating container inlet 11 and water heat dissipating container outlet 12 to circulate water contained in the water heat dissipating container 10 when there is water supplied to the water heat dissipating container inlet 11.

The bent refrigerant pipeline part 20 has a suitable shape for transferring heat from the refrigerant conducted by the condenser coil to outside. Although, the bent refrigerant pipeline part 20 is shown in the drawing is in shape of a gradually inward vortex circle (similar to a incense ring vortex shape), however the present invention is not limited to any shape of the bent refrigerant pipeline part 20, other shapes, for example spiral vortex shape, spring shape, or any other similar shape, may be applied, as long as it makes the total length of the bent refrigerant pipeline part 20 increased while ensuring the arrangement of the bent refrigerant pipeline part inside the inner space that is minimized its size by one or more certain directions.

The bent refrigerant pipeline part 20 is arranged inside the water heat dissipating container 10 for transferring heat from the refrigerant conducted inside the bent refrigerant pipeline part 20 to the water which is contained in the water heat dissipating container 10.

In general, the cooling system of the water filter apparatus is for cooling the water including a cooling coil and a condenser coil for cyclically circulating the refrigerant, so that the refrigerant cools down the water contained inside the water cooling container at the cooling coil region and dissipates heat at the condenser coil region.

In general, the operating principle and main components of the cooling system of the water filter apparatus are known in the prior art, detail descriptions about cooling system are intended to omit to favorably focus on main characteristics of the present invention.

The refrigerant is generally conducted for cyclically circulating via pipeline made from copper pipes which are communicated to each other to compose a closed loop a closed loop. As the result, the bent refrigerant pipeline part 20 having connectors 21 and 22 to connect with the cooling coil, wherein the connector 21 is to connect to a pipeline which conducts the refrigerant from the cooling coil to the bent refrigerant pipeline part 20 and the connector 22 is to connect to a pipeline which conducts the refrigerant from the bent refrigerant pipeline part 20 to the cooling coil.

For implementing the circulation of the water contained in the water heat dissipating container 10, the water is needed to be supplied into the water heat dissipating container inlet 11.

As shown in the drawing, making reference to the position of the connectors 21 and 22, the water heat dissipating container inlet 11 and the water heat dissipating container outlet 12, as shown the circulating direction of the refrigerant (from up to down in the drawing) and the water contained in the water heat dissipating container 10 (up from down in the drawing) is opposite. However, the present invention is not limited to these arrangements, other arrangements may be designed appropriately according to different purposes, such as depending on the relationship position between the water heat dissipating container 10 and the cooling coil and/or the RO filter cartridge to facilitate for arranging, installing, and repairing, or depending on the relationship between the circulating direction of refrigerant and the circulating direction of the water contained in the water heat dissipating container to provide higher uniform heat dissipating capability and efficiency, for example.

According to an embodiment, the water heat dissipating container inlet 11 is connected to at least the waste water outlet of a RO filter cartridge (Reverse Osmosis) of the water filter apparatus for utilizing the waste water resource for cooling the condenser coil of the water filter apparatus. It should be noted that, the condenser coil of the water filter apparatus is not limited to any configuration, in several cases, the condenser coil substantially includes a main component which is the bent refrigerant pipeline part 20 mentioned above, however the present invention is not limited thereto.

According to an embodiment, when the cooling system of the water filter apparatus is operating, so there is a need for cooling for the condenser coil, the RO filter cartridge is also operating for providing the waste water supplying to the water heat dissipating container inlet. However, it should be noted that, the water is supplied to the water heat dissipating container inlet may be not limited to the waste water resource of the RO filter cartridge. Other water resources may be supplied to the water heat dissipating container inlet to replace or supplement for the waste water resource of the RO filter cartridge. This has an advantage that, in several cases, the cooling system is operating, but, by any certain reason, the RO filter cartridge is not reasonable to operate, for example the filtered water via the RO filter cartridge which is accumulated, typically in a pressure tank, has been relatively full and the continuing of filtering process via the RO cartridge may be not preferred, or the filter operation of the RO cartridge may be performed with a limitation capacity.

According to an embodiment, the water heat dissipating system according to the present invention may further include an additional pipeline communicated from the pressure tank of the water filter apparatus to the water heat dissipating container inlet, for supplying water to the water heat dissipating container inlet, at least when the RO filter cartridge has not yet operated or been operated with a limitation capacity, for example.

A water regulating valve may be equipped on the additional pipeline to regulate the water supplying from the pressure tank to the water heat dissipating container. The water regulating valve may be an electromagnetic valve, a throttle valve, an opening and closing valve, a flow valve, or the combination thereof.

According to an embodiment, the water heat dissipating system according to the present invention further including water return line is connected at a position where is in between an outlet of a booster pump and an inlet of the RO filter cartridge return back at the position of the inlet of the booster pump, to reduce the flow supplied to the RO filter cartridge, and such that reducing the corresponding waste water of the RO filter cartridge.

The water regulating valve may be arranged on the water return line for regulating the water return back from the inlet of the booster pump, thus regulating the flow amount of the water supplied to the RO filter cartridge. The regulating valve may be an electromagnetic valve, a throttle valve, an opening and closing valve, a flow valve, or the combination thereof.

According to an embodiment, the water heat dissipating system according to the present invention may further include the flow valve is arranged at the position in between the water heat dissipating container inlet and the waste water outlet of the RO filter cartridge of the water filter apparatus.

Referring back to FIG. 1 and FIG. 2, the water heat dissipating container 10 is shown as having a rectangular parallelepiped shape, is made from suitable plastic materials, having a body portion 13 with an opening surface, a watertight seal 14, and a watertight cover 15. The design is very simple, may minimize the size and facilitate for installing, repairing the bent refrigerant pipeline part of the condenser coil, may as well as reduce the manufacturing cost.

The watertight cover 15 may be installed to fit with the body portion 13 via latches and fitting grooves 15e with corresponding grooves and latches 13e, respectively.

The connectors 21 and 22, the water heat dissipating container inlet 11 and the water heat dissipating container outlet 12 are arranged on the outer surface of the water heat dissipating container for facilitating the installation.

Figure 3:
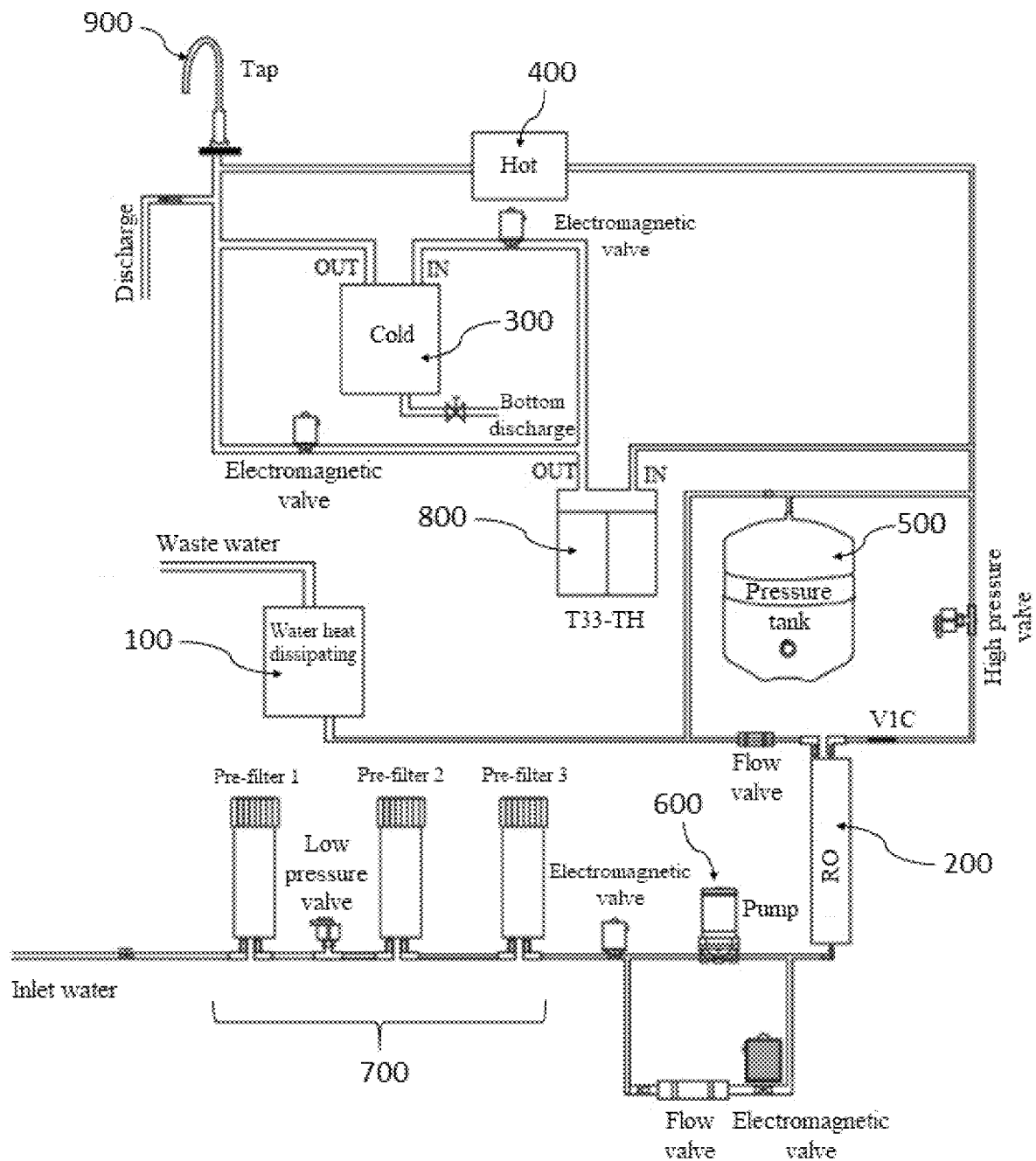
FIG. 3 is a schematic principle diagram illustrating a water filter apparatus according to an embodiment of the present invention.

In FIG. 3 is a schematic principle diagram illustrating the water filter apparatus according to an embodiment of the present invention. In general, the water filter apparatus according to the embodiment using the water heat dissipating system as described above.

As shown in FIG. 3, the water filter apparatus according to the embodiment comprising: a water heat dissipating container 100, a RO filter cartridge 200, a water cooling container 300, a water heating tank 400, a pressure tank 500, a booster pump 600, a pre-filter cartridge assembly 700, a functional filter cartridge assembly 800 (T33-TH), and user water tap 900.

In general, the water filter apparatus according to the embodiment having main components are substantially similar to those of prior water filter apparatuses, except that it is equipped with the water heat dissipating system as described above. The main components such as the RO filter cartridge 200, the water cooling container 300, the water heating tank 400, the pressure tank 500, the booster pump 600, the pre-filter cartridge assembly 700, the functional filter cartridge assembly 800 (T33-TH), and the user water tap 900, may be provided to have functions and operations similar to those of the prior water filter apparatuses and may be arranged by any way, wherein among these components may arranging electromagnetic valves, a low pressure valve, a high pressure valve, a flow valve (the flow valve, such as Flow 300 for example), an one-way valve (V1C), etc., appropriately to be capable of automatically carry out the water filtering function of the water filter apparatus.

As also shown in FIG. 3, the water filter apparatus according to the embodiment using the water heat dissipating system having the water heat dissipating container 100 with configuration and characteristics similar as described above. The repeated descriptions are intended to be omitted to avoid redundancy.

According to the embodiment, the water heat dissipating container 100 is supplied with water from the waste water outlet of the RO filter cartridge and an additional pipeline connected from the pressure tank 500. In addition, the water regulating valve are arranged on the water return line connected at the outlet of the booster pump 600, is an electromagnetic valve combined with a flow valve. Thus, the water heat dissipating system of the water filter apparatus may operate simultaneously with the RO water filtering, but the water heat dissipating system may also operate independently without an operation requirement of the RO water filtering within several/some certain times, for example when water is stored relatively full in the pressure tank 500 and having a relatively high pressure, for example.

To facilitate for moving and changing the installed place of the water filter apparatus, the water filter apparatus according to the present invention may use cabinet cover for containing at least main components of the water filter apparatus inside the cabinet cover.

Although some embodiments have been described herein, and may accompanying with alternative or equivalent embodiments or specific exemplarily embodiment, using suitable descriptive terms and technical terms for person skilled in the art may understand and pertain the present invention. Therefore, the person skilled in the art may obviously implement modifications, equivalent arrangements, or variations based on the described embodiments. Therefore, all these modifications, equivalents, or variations fall within the protection scope of the claims appended, and the scope of the protection of the present invention is obviously not limited to contents and descripted embodiments but is defined in the following claims.

What is claimed is:

1. A water filter apparatus comprising:
   a water cooling container;
   a cooling system including a cooling coil and a condenser coil for cyclically circulating refrigerant, so that the refrigerant cooling down water contained in the water cooling container at the cooling coil region and dissipates heat at the condenser coil region;
   a pressure tank;

at least one water filter unit with a RO filter cartridge for supplying filtered water into the pressure tank and the water cooling container, wherein the RO filter cartridge having a waste water outlet; and a water heat dissipating system for dissipating heat for the condenser coil of the water filter apparatus, wherein said condenser coil of the water filter apparatus including a bent refrigerant pipeline part with a suitable shape for transferring heat from a refrigerant conducted by the condenser coil to outside, wherein the water heat dissipating system comprising:

a water heat dissipating container for containing water therein, the water heat dissipating container having a water heat dissipating container inlet and a water heat dissipating container outlet to circulate water contained in the water heat dissipating container when there is water supplied to water heat dissipating container inlet;

wherein:

the bent refrigerant pipeline part is arranged inside the water heat dissipating container for transferring heat from the refrigerant conducted inside the bent refrigerant pipeline part to the water contained in the water heat dissipating container, the water heat dissipating container inlet is connected to at least a waste water outlet of a RO filter cartridge (Reverse Osmosis) of the water filter apparatus, wherein said system further including an additional pipeline communicated from a pressure tank of the water filter apparatus to the water heat dissipating container inlet, for supplying water to the water heat dissipating container inlet, at least when water is stored full in the pressure tank and having a high pressure.

2. The water filter apparatus according to claim 1, wherein said water filter apparatus using cabinet cover for containing at least the water cooling container, the cooling coil, the condenser coil, the pressure tank, the water filter unit, and the water heat dissipating container inside the cabinet cover.

3. The water filter apparatus according to claim 1, wherein the water heat dissipating system further including a water regulating valve equipped on the additional pipeline.

4. The water filter apparatus according to claim 3, wherein the water heat dissipating system further including a water return line connected at a position where is in between an outlet of a booster pump and an inlet of the RO filter cartridge return back at the position of the inlet of the booster pump, for reducing water flow supplied to the RO filter cartridge, and therefore reducing the corresponding waste water of the RO filter cartridge.

5. The water filter apparatus according to claim 1, wherein the water heat dissipating system further including a water regulating valve equipped on the water return line.

6. The water filter apparatus according to claim 1, wherein the water heat dissipating container is made from plastic, having a rectangular parallelepiped shape with an opening surface with a watertight cover, for facilitating for installing the bent refrigerant pipeline part of condenser coil.

7. The water filter apparatus according to claim 1, wherein:

the water heat dissipating container inlet and outlet of the water heat dissipating container having fast connectors arranged on the outer surface of the water heat dissipating container, and the bent refrigerant pipeline part of condenser coil having connectors, for connecting with the cooling coil of the water filter apparatus, arranged on the outer surface of the water heat dissipating container.

\* \* \* \* \*